United States Patent [19]

Höveler

[11] Patent Number: 4,693,050

[45] Date of Patent: Sep. 15, 1987

[54] BOTTLE PLATE IN A BOTTLE-PROCESSING MACHINE

[75] Inventor: Egon Höveler, Haan, Fed. Rep. of Germany

[73] Assignee: Jagemberg AG, Dusseldorf, Fed. Rep. of Germany

[21] Appl. No.: 853,728

[22] Filed: Apr. 18, 1986

[30] Foreign Application Priority Data

Apr. 19, 1985 [DE] Fed. Rep. of Germany ....... 3514239

[51] Int. Cl.⁴ ............ B32B 5/16

[52] U.S. Cl. ............ 53/137; 428/64; 428/143; 428/148; 428/149; 428/220; 428/335

[58] Field of Search ............ 428/64, 143, 149, 220, 428/335, 148; 53/137, 334

[56] References Cited

U.S. PATENT DOCUMENTS 2,883,817 4/1959 Foresman ............ 53/334
4,042,085 8/1977 Bjerk et al. ............ 428/64 X

FOREIGN PATENT DOCUMENTS 8319977 12/1983 Fed. Rep. of Germany .

*Primary Examiner*—Alexander S. Thomas
*Attorney, Agent, or Firm*—Karl F. Ross; Herbert Dubno

[57] ABSTRACT

A bottle plate for receiving a bottle in a bottle-processing machine has a metal plate to which a flexible covering is adhered in order to satisfy high requirements regarding frictional contact between the covering and bottom of the bottle, granules of silicon carbide or corundum are embedded in the covering. These granules project into fissures in the microscopically uneven bottom of the bottle hook therein and thus fix the bottle to the disk against slip. The covering is flexible to promote this contact.

4 Claims, 2 Drawing Figures

BOTTLE PLATE IN A BOTTLE-PROCESSING MACHINE

FIELD OF THE INVENTION

My present invention relates to a bottle plate for receiving bottles and for rotating bottles in a bottle-treatment or bottle-processing (e.g. a bottle-labeling) machine.

BACKGROUND OF THE INVENTION

In bottle-treatment machines, which are constructed with revolving supports, bottles are supplied to the bottle-treatment machine by a supply conveyor, generally a plate conveyor belt.

The bottles are then pushed laterally from the plate conveyor belt by means of so called star wheels and supplied by way of a sliding table to the rotary bottle support or turret of the bottle-treatment machine.

This bottle support is equipped with the bottle plates, each of which receive one bottle to be treated. Each bottle is centered on the individual bottle plate by a centering head and clamped so as to render it, as much as possible, incapable of rotating relative to the bottle plate.

This clamping is necessary in order to ensure the subsequent methodical treatment of the bottle. The bottle plates on the bottle supports are, however, mounted to rotate and are provided with a controlled drive. The rotary movement of these bottle plates is intended to be transmitted with as little slip as possible to the bottle standing upon and clamped to the bottle plate.

Normally the plate conveyor belts are lubricated with a lubricant in order to facilitate lateral displacement of the bottles from these belts. Since the lubricant sticks to the annular bases of the bottles as they are conveyed on the plate conveyor belt and is also transferred to the bottle plates, it is practically a certainty that the lubricant will interfere with the desired non-slip transmission of the controlled rotary movement of the bottle plates to the bottles.

German utility model-Gebrauchsmuster DE-GM No. 83 19 977 attempts to reduce the slip between the bottle plate and bottle caused by the aforementioned lubricant for the plate conveyor belts.

In this system the bottle plate comprises a metal plate with a flexible covering. The covering has recesses uniformly distributed over the surface.

The top surfaces of the active surface parts of the covering are preferably constructed as truncated cones or truncated pyramids with mini points. The intent of this bottle plate is to increase the surface pressure between the bottom of the bottle and the bottle plate over the reduced active area so that the top surfaces with the mini points in the form of cones and pyramids may penetrate the film of lubricant and to push it aside as pressure is increased.

A bottle plate constructed in this way does not always satisfy the requirements of the greatest possible freedom from slipping between the bottle plate and bottle. Sometimes residue of lubricant still remains between the top surfaces of the flexible covering and the bottle bottoms and the flexible covering, preferably of rubber, particularly in the presence of lubricants, frequently has inadequate frictional contact with the glass of the bottle.

OBJECTS OF THE INVENTION

It is, therefore, the principal object of the invention to provide an improved bottle plate for the purposes described with greatly enhanced frictional contact between the bottle plate and the bottle bottom so that it satisfies increased requirements.

Another object is to provide an improved bottle plate which avoids the drawbacks of earlier units of this type.

SUMMARY OF THE INVENTION

These objects and others which may be developed below, are achieved with a bottle plate for receiving bottles and for the rotary drive of same in a bottle-treatment or bottle-processing machine, the bottle plate consisting of a metal plate or disk with a flexible covering on its bottle receiving surface. According to the invention small hard and sharp-edged granules are embedded in the flexible covering which may be composed of rubber, a synthetic resin or a foamed elastomeric product of another type.

The flexible covering preferably has a hardness of between 45 and 60 Shore A, and the granules which are embedded therein preferably consist of corundum or silicon carbide with a grain size of 350 to 420 microns (micrometers). The flexible covering provided with the granules is stuck or adhered to the metal plate.

The small, hard and sharp-edged granules embedded in the flexible covering appear to become hooked in the fissures of the bottom of the bottle which is uneven in the micro range.

Moreover, the hard granules tend to be brittle, splinter easily under the action of force and form new sharp edges, which favor adhesion in the fissures of the bottom of the bottle. Frictional contact is consequently substantially increased.

Experiments have also shown that the frictional contact between covering and bottom of the bottle which is very good under dry conditions is reduced only slightly in wet conditions, surprisingly even when soap solution is applied and, in particular, in the presence of the aforementioned conveyor lubricant.

The covering of the bottle plate is flexible in order to allow it to be in contact as far as possible with all points of the uneven bottom of the bottle. In this way, as many granules as possible have the opportunity of hooking and engaging in the microfissures in the bottom of the bottle.

BRIEF DESCRIPTION OF THE DRAWING

The above and other objects, features and advantages of the present invention will become more readily apparent from the following description, reference being made to the accompanying highly diagrammatic drawing in which.

SPECIFIC DESCRIPTION

A bottle plate 1 consists of a metal plate or disk 2, to which a flexible covering 3 is adhered. A bottle 4 stands on the latter, the bottle being clamped as far as possible in a non-rotary manner under the force of a centering head (not shown) in the direction Pl. The bottle plate can be mounted on a turret or turntable of a bottle processing machine which is provided with the aforementioned head.

Figure 1:
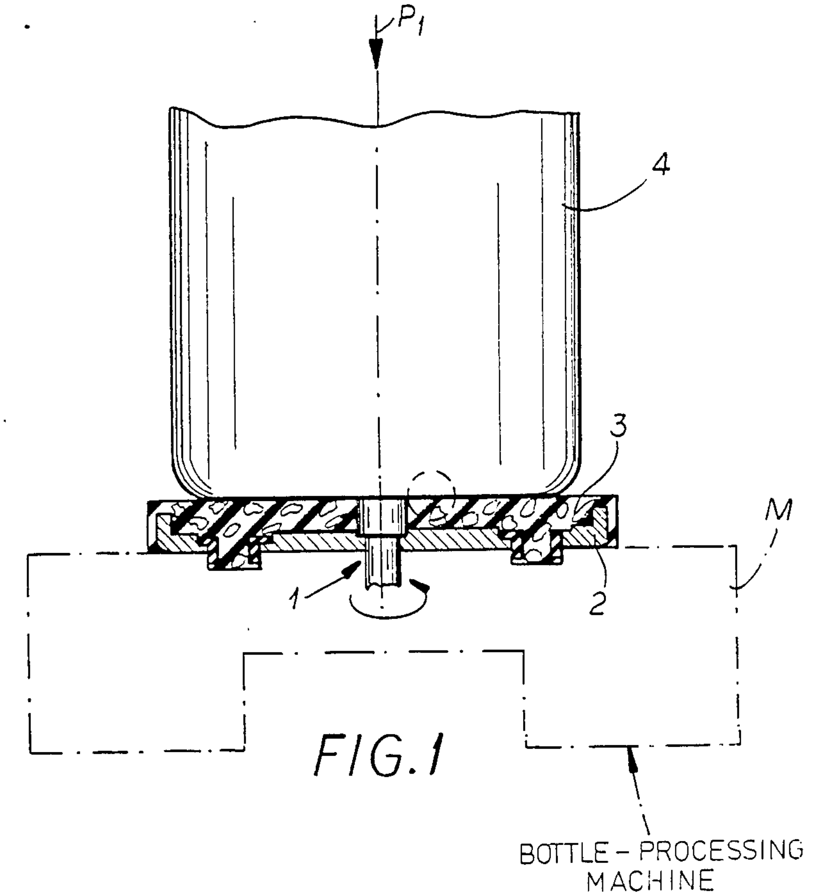
FIG. 1 is a sectional view of the bottle plate in a bottle-processing machine.
Figure 2:
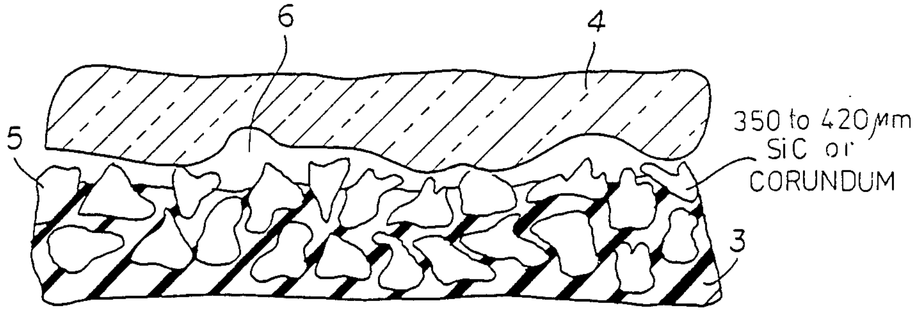
FIG. 2 is a detail view which shows an adhesion point between the covering and bottom of the bottle in greatly enlarged form.

As FIG. 2 shows, in the micro range, i.e. to greatly enlarged scale, granules 5 are embedded in the flexible covering 3, which project into fissures 6 in the uneven bottom of the bottle 4 and are hooked and engage therein and thus a quasi positive connection is achieved.

Due to this penetrating or hooking engagement, the frictional contact between the covering 3 and bottle 4 is substantially increased and thus satisfies increased requirements regarding resistance to slipping.

The covering 3 preferably has a hardness of between 45 to 60 Shore A, so that it will be resilient enough to adapt itself as far as possible to the uneven surface of the bottom of the bottle. Thus the maximum number of granules 5 have the opportunity of engaging in the fissures 6 in the bottom of the bottle 4.

The granules 5 preferably consist of silicon carbide or corundum with a grain size of 350 to 420 microns uniformly dispersed in the rubber or synthetic resin of the covering. These very hard minerals have the property of splintering easily under force and in this way form new sharp edges, which favor the adhesion of the granules 5 in the fissures 6 of the bottom of the bottle and thus contribute to an increase in the frictional contact.

I claim:

1. In a bottle-processing machine wherein bottles are individually clamped against a bottle plate which is rotatable to rotatably entrain the bottle thereon, the improvement wherein said bottle plate comprises:

a metal disk; and a flexible covering on an upper surface of said disk against which said bottle is pressed, a multiplicity of small hard sharp-edged frangible granules composed of a material selected from the group which consists of corundum, silicon carbide and mixtures thereof being embedded in said flexible covering and having projections exposed on a surface of the covering and engageable with a bottom surface of said bottle when said bottle is pressed against said covering.

2. The improvement defined in claim 1 wherein said flexible covering has a hardness between 45 and 60 Shore A.

3. The improvement defined in claim 1 wherein said granules have a grain size of 350 to 420 $\mu$m.

4. The improvement defined in claim 1 wherein said covering is adhered to said disk.

* * * * *